United States Patent Office 3,331,816
Patented July 18, 1967

3,331,816
AMINO-FUNCTIONAL AZOMETHINE CONTAINING POLYSULFIDE POLYMERS AND THEIR REACTION PRODUCTS WITH POLYEPOXIDES
Eugene R. Bertozzi, Yardley, Pa., assignor to Thiokol Chemical Corporation, Bristol, Pa., a corporation of Delaware
No Drawing. Filed Sept. 22, 1964, Ser. No. 398,422
9 Claims. (Cl. 260—79)

The present invention relates to a novel class of liquid amino-functional azomethine containing polysulfide polymers, and to the novel resinous reaction products of amino-functional azomethine containing polysulfide polymers with polyepoxides, and further to the processes for their production.

Mercaptan-terminated polysulfide liquid polymers, such as may be symbolized by the formula $$H(SRS)_x(SR'(SH)_nS)_yH$$

where $x$ varies from 2 to 10, $y$ varies from 0 to 10, and $n$ varies from 0 to 2 and made in accordance with the teachings of U.S. Patent 2,466,936 to Patrick et al., dated Apr. 12, 1949, were revealed to form valuable resinous products with polyepoxides by Fettes and Gannon, in their U.S. Patent 2,789,958. Other valuable resinous products of the reaction of hydroxy-terminated polysulfide polymers and polyepoxides were also revealed in U.S. Patent 2,789,958. Such hydroxy-containing polysulfide polymers may be produced in accordance with the teachings of Fettes in his U.S. Patent 2,606,173. Fettes and Gannon also teach the use of aliphatic amines as separate catalysts to promote the formation of these valuable resinous products.

Indeed it has been found that use of amines is needed to provide practical rates of reaction between the aforesaid polysulfide polymers and polyepoxides. Many of the useful separate catalysts for such reactions are quite toxic, and among others include such compounds as tri-(dimethyl-amino-methyl) phenol, diethylenetriamine, dimethylaminomethyl phenol, triethylenetetramine, dimethylaminopropylamine, dimethylaminopropionitrile, 2-ethyl hexoic acid salt of tri(dimethylaminomethyl) phenol, and m-phenylenediamine. Where no separate amine catalyst is used the reactants, according to prior art practice, must endure unduly long cure intervals, and even where very low molecular weight polysulfide reactants and elevated cured temperatures are employed. Further, in the instance where a separate amine catalyst is used the practitioner suffers the inconvenience, disadvantages, and dangers inherent in weighing out and compounding into the polysulfide-polyepoxide mixtures relatively small quantities of highly active catalytic materials. These events invite high relative error in the compounding process, and thus a high degree of uncertainty in the reproducibility of the cured resinous products obtained. Another disadvantage presents itself due to dermatological irritations provided by many of these separate amine catalysts. To avoid these inconveniences and dangers, unusual caution must be provided in the compounding of the reactant and catalysts; these precautions increase substantially the time and cost of providing the resinous products. Another economic disadvantage in the use of separate amine catalyst involves the necessary use of a separate blending operation in which a small amount of amine must be uniformly dispersed into a relatively large volume of polysulfide-polyepoxide reactants. This procedure enhances the probability of providing nonuniformly cured resinous compositions due to a nonhomogeneous blending of the separate catalyst throughout the reaction mixture. Nonuniformity of cure invites impairment of the gross physical properties of the cured resinous products, as well as a reduced ability to reproduce from batch to batch cured resinous products of similar physical properties. Still other disadvantages flow from the use of separate amine catalysts in the prior art compositions. Some amine catalysts, for example, are either insoluble in or are only partially soluble in the liquid polysulfide-polyepoxide reactants; this imparts substantial difficulties to the uniform dispersion of catalysts in reactants. Some amine catalysts will cause reversion of the solid cured resinous products, after their cure and upon aging and/or heat treatment, to provide an undesirable deterioration with time in the physical properties of the cured resinous products. It is the remedy of these and other difficulties that the present invention is directed.

The present invention concerns the preparation and use of amino-functional azomethine containing polysulfide polymers, and especially their reaction with polyepoxides at economical cure rates sans separate amine catalysts to provide useful resinous products with enhanced properties of flexibility, stability, and utility. Fettes, in his U.S. Patent 2,606,173, has revealed a method for the preparation of certain types of amino-functional polysulfide liquid polymers. Fettes presents a series of equations numbered 1 to 7, depicting the preparation of this class of amino-functional polysulfide liquid polymers, and wherein mercaptan-functional polysulfide liquid polymers are reacted with amino-mercaptans in the presence of oxygen, or oxygen contributing substances, in reversible reactions to form amino-functional polysulfide liquid polymers and water.

The Fettes and Gannon compositions and their method for providing certain amino-functional polysulfide liquid polymers suffer from several substantial disadvantages. Among these may be included (a) the necessary removal of water from the polysulfide product to prevent reversion of the product to the amino-mercaptan and mercaptan-functional polysulfide polymer reactants. In contradistinction, the presence of water has no deleterious effect on the stability of the present amino-functional azomethine containing polysulfides. Another substantial disadvantage inherent to the Fettes and Gannon method is that it requires (b) extreme care in exactly prescribing the amount of amino-mercaptan reactant employed. Even small excesses of such mercaptan will cause substantial, excessive, multiple, and unequal scissions of the polysulfide polymer reactant and split the polymer into small unequal fragments, even to forming some monomer, viz., U.S. 2,606,173, bridging paragraph columns 4 and 5. The Fettes and Gannon process (c) makes it necessary to use only mercaptan terminated polysulfide reactants. Further, (d), the random nature of scission at disulfide linkages of the polysulfide makes it very difficult to obtain an amino-polysulfide liquid product with a prescribable and narrowly distributed range of molecular weights as is demanded by the present state of the art to provide resinous cure products with reproducible and prescribable physical properties. Thus, although the Fettes and Gannon amino-functional polysulfide polymers may be used with polyepoxides to provide resinous products, they do not provide the versatility and uniformity that are provided by amino-functional azomethine containing polysulfide polymers of the present invention.

It is an object of this invention to provide novel amino-functional azomethine containing polysulfide liquid polymers which will provide novel resinous cure products of enhanced flexibility, stability, and utility upon reaction with polyepoxides.

It is another object of this invention to provide a novel class of amino-functional azomethine containing polysulfide liquid polymers by reaction of chalocogen-hydric functional polysulfide liquid polymers with an alkenal and a poly-primary amine and a process therefor.

Another object of this invention is to provide novel resinous reaction products of amino-functional azomethine containing polysulfide liquid polymers and polyepoxides which have enhanced properties of flexibility, stability, and utility, and a process therefor.

Other objects of this invention are apparent from or are inherent in the following explanations and example.

It has been unexpectedly discovered that the foregoing objects are attained through the novel compositions and processes of this invention. In particular, it has been unexpectedly found that if amino-functional azomethine containing polysulfide liquid polymers are formed by the reaction of relatively low molecular weight alkenals and poly-primary amines with liquid chalcogen-hydric terminated polysulfide liquid polymers, e.g., OH or SH terminated polysulfide polymers, the latter being prepared according to the teachings of U.S. 2,606,173 and U.S. 2,466,963, respectively, that they may be reacted with polyepoxides to provide novel solid resinous cure products with enhanced properties of flexibility, stability, and utility.

The amino-functional azomethine containing polysulfide polymers of this invention may be described as that class of compositions having molecular structures depicted by the formula $$\left(R^i-L\right)_y\left(RSS\right)_x\left(R-L-R^{ii}\right)_z$$

wherein $R^i$ and $R^{ii}$ are as follows: the azomethine-amino groups $$-\overset{R_a}{\underset{|}{C}}H-\overset{R_b}{\underset{|}{C}}H-\overset{H}{\underset{|}{C}}=N-\left(R_c-NH\right)_d R_c-NH_2$$

wherein $R_c$ is an alkylene group having up to 6 carbon atoms, $d$ is an integer that is one of 0, 1, 2, 3, 4 and 5, $y$ and $z$ being one of 1, 2, 3, and 4, $R_a$ and $R_b$ are the same or different and are radicals chosen from the group consisting of hydrogen, normal and branched alkyl radicals having up to 6 carbon atoms and substituted and unsubstituted alkylene-aromatic, aromatic and alicyclic radicals, R is an intervening group selected from the class of intervening groups listed in U.S. 2,789,958, Tables I and II, and $x$ is a positive number greater than 1. The most useful amino-functional azomethine containing polysulfide polymers of this invention are those which are normally liquid at 25° C. and have a molecular weight of at least 400, and in the range of 400 to 10,000. The preferred polymers are those wherein $y$ and $z$ are 1, $x$ is 2 to 10, —L— is —S—, R is an ethylene or a diethylene *gem* diether radical, and $R^i$ and $R^{ii}$ are the same and are $$-CH_2CH_2CH=N-\left(CH_2CH_2NH\right)_d CH_2CH_2NH_2$$

wherein $d$ is 1 or 2.

The novel process by which the present class of amino-functional polysulfide polymers may be prepared is a two-step process and may be generally summarized as follows:

Step 1:

$$\left(HL\right)_y\left(RSS\right)_x\left(R-LH\right)_z + a\left(\overset{R_a}{\underset{|}{HC}}=\overset{R_b}{\underset{|}{CH}}-C\overset{O}{\underset{H}{\diagdown}}\right) \longrightarrow \text{(I), viz.}$$

wherein —L— is —O—, or —S—, and $x$, R, $R_a$, $R_b$, and $y$ and $z$ are as previously defined, and —LH is a chalcogen-hydric radical, and $a$ is a number $\leq(y+z)$.

Alkenals useful in the practice of this invention are compounds containing a terminal olefinic group having at least one hydrogen on the terminal carbon atom, and a terminal aldehyde grouping, viz.

$$\overset{R_a}{\underset{|}{HC}}=\overset{R_b}{\underset{|}{C}}-\overset{O}{\underset{H}{\overset{\|}{C}}}-H$$

wherein $R_a$ is hydrogen or a lower alkyl group having up to 6 carbon atoms, $R_b$ is hydrogen, a lower alkyl group having up to 6 carbon atoms, a benzyl or an alkylbenzyl group the alkyl portion having up to 6 carbon atoms, an alkyl ether group having up to 6 carbon atoms. Typical of the useful alkenals for preparing the instant polymers are:

Acrolein or propenal—$H_2C=CHCHO$,
Trans-2-butenal—$CH_3CH=CHCHO$, and
2-methyl-2-butenal—$CH_3CH=C(CH_3)CHO$;

the most preferred alkenal is acrolein.

Poly-primary amines are used in the practice of this invention which contain at least two primary amine groups separated by alkylene groups having up to about 6 carbons, alkylene-secondary amine-alkylene groups having up to six carbon atoms in each alkylene linkage, and benzyl and alkylenebenzyl groups having up to about six carbon atoms in the alkylene portion. The preferred poly-primary amines for instant use are those having two primary amine groups that may be separated by alkylene or alkylene-secondary amine-alkylene groups as in the formula $$H_2N-\left(R_c-NH\right)_d R_c-NH_2$$

wherein $R_c$ is an alkylene group having up to six carbon atoms and $d$ is an integer that is one of 0, 1, 2, 3, 4 and 5. The most preferred, useful poly-primary amines are those depicted by the foregoing formula wherein $R_c$ is an ethylene linkage and $d$ is one of 1 and 2, the presence of the secondary amine groups in the preferred amines aids in yet further accelerating the reaction of the polysulfide polymers formed therewith with polyepoxides.

The azomethine groups present in the instant polysulfide polymers may be depicted as $$-\overset{H}{\underset{|}{C}}=N-$$

and are most usually found in the organic chemical arts in compounds known as "Schiff bases."

To form the present amino-functional azomethine containing polymers, —SH, and/or —OH functional polysulfide liquid polymers are mixed and heated in the presence of an alkenal and a poly-primary amine, defined as above in the two step process wherein the ratio of at least one equivalent of amine per one half equivalent weight $$\left[\overset{O}{\underset{H}{\overset{\diagup}{C}}}-\overset{R_b}{\underset{|}{HC}}-\overset{R_a}{\underset{|}{HC}}L-\right]_{a/2}\left(RSS\right)_x\left[-R-L-\overset{R_a}{\underset{|}{CH}}-\overset{R_b}{\underset{|}{CH}}-C\overset{O}{\underset{H}{\diagdown}}\right]_{a/2}$$
$$\left(HL\right)_{y-a/2} \qquad \left(R-LH\right)_{z-a/2}$$

Step 2:

$$(I) + a\left(H_2N-\left(R_c-NH\right)_d R_c-NH_2\right) \longrightarrow$$

$$\left[H_2N-R_c-\left(HN-R_c\right)_d-N=HC-\overset{R_b}{\underset{|}{HC}}-\overset{R_a}{\underset{|}{HC}}L-\right]_{a/2}\left(RSS\right)_x\left[-RL-\overset{R_a}{\underset{|}{CH}}-\overset{R_b}{\underset{|}{CH}}-CH=N-\left(R_c-NH\right)_d R_c-NH_2\right]_{a/2} + a(H_2O)$$
$$\left(HL\right)_{y-a/2} \qquad \left(R-LH\right)_{z-a/2}$$

of a chalcogen-hydric functional polysulfide is used, the latter equivalent being defined in conventional terms of mercaptan, and/or hydroxy functionality. Useful polymer products are obtained thereby where in fact not every —LH grouping may be reacted, and where the polymer product may give evidence of the presence of both reactive amine and reactive —LH groupings. To provide faster curing polysulfides of this invention one may increase the ratio of equivalents of reactive amine to reactive —LH groupings present in the polymeric product. One method that may be used is to increase the charge ratio of equivalents - of - amine/equivalents-of-chalcogen-hydric radicals above 2:1; in certain instances ratios of 10:1 and even higher are usefully employed.

The present invention contemplates the use of mixtures of different alkenals and poly-primary amines such as occurs where the $R_a$ and $R_b$ and/or $R_c$ radicals and the number $d$ in the component alkenals and poly-primary amines are different, to form other novel amino-functional polysulfide polymers of this invention, some molecules of which have the same and some dissimilar terminals. At any one time therefore the amino-functional azomethine containing polysulfide compositions of the present invention would contain molecules with active amine terminals which may be either the same or different, depending upon whether one or more than one alkenal and/or poly-primary amine reactants were used in their formation, and in addition would contain some molecules with —LH terminals.

In the process to prepare the present alkyl amino-functional azomethine containing polysulfide polymers elevated temperatures are used to facilitate reaction.

Amino-functional azomethine containing polysulfide polymers of this invention are liquids which exhibit toxicities that are substantially less than those exhibited by mixtures of —LH polysulfide polymers and the separate prior art catalysts often used to promote and enter into polysulfide-polyepoxide resin reactions; further, the physical and chemical characteristics of the present amino-functional azomethine containing polysulfide compositions provide for no greater handling problems than those of the —LH terminated polysulfide reactants used in their preparation. The process of the invention makes it apparent that the distribution of molecular weights of the present amino-functional polysulfide polymer products closely follows the distribution of molecular weights of the —LH terminated polysulfide reactants. No scission of polysulfide molecules occurs as it does in the Fettes and Gannon process. Further, water, produced as a by-product, has no deleterious effect as it does in the Fettes and Gannon process.

Polyepoxide materials react with the above described liquid amino-functional azomethine containing polysulfide polymers to form desirable resinous products. The polyepoxides are preferably liquids which have an average epoxide functionality of approximately two epoxide groups per molecule of polyepoxide material. The position of epoxide groups in the polyepoxide material is not critical to the practice of this invention. For instance, if the polyepoxide material is essentially linear in structure epoxide groups may be in terminal positions or they may be positioned intermediately and/or randomly along the linear structure. Polyepoxide materials which may enter into cure with the above defined polysulfide polymers include the following types of materials:

(1) Essentially linear types such as

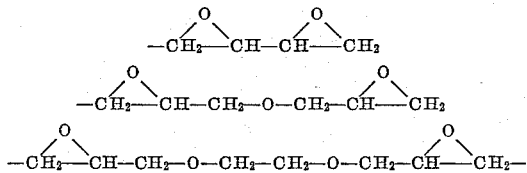

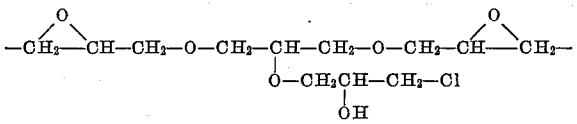

and epoxidized polybutadiene materials such as those which have an epoxide functionality of four or more and which are available under the designation "Oxiron" resins, i.e., "Oxiron 2000," "Oxiron 2001" and "Oxiron 2002";

(2) Epichlorohydrin-bisphenol A types which are aromatic in nature and which include those available under the trademark designation "Tipox," i.e., "Tipox A," "Tipox B," and "Tipox C," those available under the designation "Epon" resins, i.e., "Epon 828" and "Epon 820," those available under the designation "Bakelite ERL" resins, and those available under the designation "Epi-Rez" resins, i.e., Epi-Rez 510;

(3) Cyclo-aliphatic types which include those available under the designation "Unox" resins, i.e., "Unox 206," which is epoxy ethyl-3,4-epoxy cyclohexane and "Unox 201," which is 3,4-epoxy-6-methylcyclohexylmethyl-3,4-epoxy-6-methylcyclohexanecarboxylate;

(4) Resorcinol diglycidyl ether types which include those available under the designation "Kopoxite" resins. i.e., "Kopoxite 159";

(5) Epoxy novalak type which includes the resins available under the designations "Dow Epoxy Novalak 438" and "DEN 438–EK 85," and also those available under the designation "KER" resins, i.e., "KER 357A" and "KER 955A";

(6) Epoxidized fatty acid resins including the Epoxol materials such as "Epoxol 9–5"; and others. In certain instances some solid polyepoxide materials may be used, say where a finely distributed uniform dispersion with the instant liquid polysulfide polymers may be obtained, or where the solid polyepoxides are soluble either in the instant polysulfides or in a common cosolvent with the instant polysulfides. Useful polyepoxide materials according to the practice of this invention have epoxide equivalent weights of 100 to over 4000. Thus within the requirements here taught a practitioner in the art may choose from among a wide variety of polyepoxide materials as to specific epoxide equivalent values, specific molecular configuration, molecular weight and functionality to pursue practice of this invention for specific end uses.

The novel solid resinous cure products of this invention are obtained by reaction between the present amino-functional azomethine containing polysulfide polymers and the above defined polyepoxide materials according to a simple process. They are mechanically admixed to form a uniform liquid blend or dispersion and then are permitted to cure within some given temperature range within from ambient temperatures to about 150° C. The reactants being liquid are usually completely compatible one with the other. Once blended together the polyepoxides and amino-functional azomethine containing polysulfides, after an induction period known as the "pot life," and which is dependent upon the nature of the reactive components and the temperature, will perceptively cure to useful solid flexible resinous compositions. In some end uses, where desired, tacky or tack-free solid products may be obtained depending upon the quantities and types of reactants used. Cure rate is importantly dependent upon the chemical nature of the specific system of coreactants used, and the temperature of cure. In some instances at specific temperatures, solid resinous compositions are obtained within 15 minutes of blending, and other instances with other specific coreactants at these same specific temperatures it may require days to obtain the desired solid compositions. In general, faster rates of cure will be obtained where the ratio of amino-/LH equivalents in the polysulfide is increased, where the temperature of cure is increased, further where lower molecular weight coreactants are used, and even further where epoxide functionality of the polyepoxide chosen is increased.

The range of useful ratios of weight proportions of polyepoxides to that of the present amino-functional azomethine containing polysulfide polymers suitable for cure in present practice extends from less than about 1:5 to more than about 5:1. It has been found however that the most useful resinous compositions are obtained where the ratios of weight proportions of polyepoxides to that of amino-functional azomethine containing polysulfides fall within the range of 1:2 to that of 2:1.

The present range of useful cure temperatures extend from below common room temperatures, 20 to 25° C., to above 150° C.; this also offers wide choice to the practitioner to suit the requirements of specific end uses, pot life and cure times and thus imparts added utility to the present invention.

Amino-functional azomethine containing polysulfide polymers produced according to the practice of this invention find use as flexibilizing agents in resinous products of reaction with polyepoxide materials and unexpectedly provide unusually desirable working properties both to the liquid formulations prior to cure, and to the solid resinous products obtained after cure. Cured castings produced with the present reaction products unexpectedly possess unusual degrees of flexibility, far out of proportion to that which may be expected from prior art experience with castings formed as the reaction products of —LH terminated polysulfides and polyepoxides taught by U.S. 2,789,958. Separate catalysts are not needed to practice this invention. The present amino-functional azomethine containing polysulfide polymers present further substantial advantage in that they will react, in general, far more rapidly with polyepoxide materials than will analagous prior art —LH terminated polysulfides in the absence of separate amine catalysts. Yet, further, the novel liquid polysulfide polymers of this invention may be compounded into cure systems with polyepoxide materials with far greater ease, in less time, with a greater degree of compatibility and homogeneity and with less danger from toxicity than may prior art systems employing separate amine catalysts. These substantial advantages and others are obtained through use of compositions of the present invention.

The following example is given to more fully explain the nature of the present invention, but is merely illustrative and does not seek to limit its scope as defined by the claims.

EXAMPLE

A.—*Preparation of amino-functional azomethine containing polysulfide polymer*

A 500 ml. three-necked round flask fitted with stirrer, thermometer, and condenser open to the atmosphere was sequentially charged with (a) 120 g. (about 0.12 mol) of a di-mercaptan functional polysulfide liquid polymer of approximately 1,000 molecular weight and predominantly composed of the repeating unit $(C_2H_4OCH_2OC_2H_4SS)$ and containing approximately 2% by weight of cross-linking units effected by trichloropropane, and (b) 12 g. (about 0.214 mol) of the alkenal acrolein (propenal). The reactants were stirred at ambient temperatures for 10 minutes, during which their temperature rose to about 40° C. and then fell. The reactant mixture was then heated to about 50° C. and maintained thereat for about 2 hours with stirring. The viscosity of the pot mixture increased somewhat during this interval, and the odor of acrolein was still perceptable at its end.

The liquid pot mixture was transferred to a dropping funnel, and admitted slowly with stirring to 30 g. (about 0.204 mol) of triethylenetetramine in a clean 500 ml. three-necked round bottom flask fitted as described above over a period of 1 hour 20 minutes. The temperature of the pot contents was maintained at 50° C. during this interval. The temperature was then permitted to fall to ambient, and stand thereat for two to three days. The pot product obtained was a ruddy colored rather viscous liquid polymer that smelled of amine. The product was then heated slowly to about 90° C. under a reduced pressure of about 50 mm. Hg, from which about 1.2 ml. of water was distilled. Analysis yielded approximately 5.67% by weight of nitrogen, as compared with an approximate theoretical 7% nitrogen for an amino functional azomethine containing polymer of formula

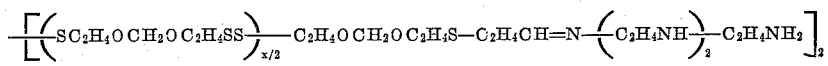

and of molecular weight of about 1,200 to 1,300.

B.—*Resinous cure products with polyepoxide*

The cure properties and products of the liquid amino-functional azomethine containing polysulfide polymer produced in A above, and hereinafter called Polymer A, and a liquid bisphenol-A-epichlorohydrin polyepoxide with epoxide equivalent of 180 to 200 and viscosity at 77° F. of 90 to 180 poises, and hereinafter called Epi-Rez 510 Polyepoxide, were observed when they were admixed under the conditions and in the proportions listed in the following table.

| Experiment | (a) | (b) |
|---|---|---|
| Recipe in parts by weight: | | |
|   Polymer A | 100 | 100 |
|   Epi-Rez 510 Polyepoxide | 200 | 100 |
| Properties at 80° F.: | | |
|   Liquid Pot Life, minutes | 110 | 80 |
|   Set or Gel Time, minutes | 125 | 90 |
|   Tack-Free Time of Cured Products, hours | 8 | 3 to 5 |
|   Highest Temperature during Cure, ° F | 107 | 127 |
|   Odor of Recipe | (¹) | (¹) |
| Cured Casting: | | |
|   Color | Orange | Orange |
|   Clarity | (²) | Clear |
| Hardness, Shore "D" Durometer Degrees at 80° F.: | | |
|   After 72 hours | 33 | 65 |
|   After 7 days | 51 | 72 |
|   After 14 days | 83 | 77 |
| At 120° F., measured at 80° F.: | | |
|   For 72 hours | 81 | 77 |
|   For 14 days | 83 | 78 |

¹ Slightly Amine.
² Slightly Hazy.

From the foregoing, one may note that the preferred process for providing the present amino-functional azomethine containing polysulfide polymers entails the steps of admixing the chalcogen-hydric functional polysulfide polymer and the alkenal, heating and/or permitting the temperature of the mixture produced to at least about 40° C. for about 2 hours, admixing the sub-product formed with the poly-primary amine, and heating this admixture to at least about 50° C. for at least about 1 hour.

I claim:

1. A solid resinous reaction product of a polyepoxide and an amino-functional polysulfide polymer, said polysulfide polymer having a structure corresponding to the formula

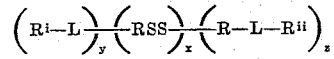

wherein $R^i$ and $R^{ii}$ are

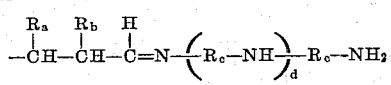

and wherein $R_c$ is an alkylene group having up to 6 carbon atoms, $d$ is an integer that is one of 0, 1, 2, 3, 4, and 5, $y$ and $z$ are each one of 1, 2, 3, and 4, $R_a$ and $R_b$ are radicals selected from the group consisting of hydrogen, normal and branched alkyl radicals having up to 6 carbon atoms, and substituted and unsubstituted alkylene-aromatic, aromatic, and alicyclic radicals, R is an intervening group selected from the group consisting of alkylene radicals, ethylenically unsaturated aliphatic hydrocarbon radicals, saturated aliphatic oxahydrocarbon radicals, saturated aliphatic thiahydrocarbon radicals and araliphatic radicals, $x$ is a positive number greater than one, and —L— is a chalcogen radical selected from the chalcogen radicals consisting of —S— and —O—.

2. A solid resinous reaction product of a polyepoxide and an amino-functional azomethine containing polysulfide polymer as recited in claim 1 wherein said chalcogen radical is —S—.

3. An amino-functional azomethine containing polysulfide polymer with a structure corresponding to the formula

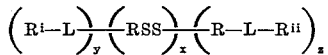

wherein $R^i$ and $R^{ii}$ are

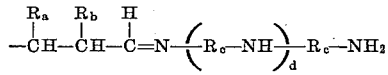

and wherein
$R_c$ is an alkylene group having up to 6 carbon atoms,
$d$ is an integer that is one of 0, 1, 2, 3, 4, and 5,
$R_a$ and $R_b$ are radicals selected from the group consisting of hydrogen, normal and branched alkyl radicals having up to 6 carbon atoms, and substituted and unsubstituted alkylene-aromatic, aromatic, and alicyclic radicals,
R is an intervening group selected from the group consisting of alkylene radicals, ethylenically unsaturated aliphatic hydrocarbon radicals, saturated aliphatic oxahydrocarbon radicals, saturated aliphatic thiahydrocarbon radicals and araliphatic radicals,
$x$ is a positive number greater than one, and
—L— is a chalcogen radical selected from the chalcogen radicals consisting of —S— and —O—.

4. A polysulfide polymer as recited in claim 3 wherein said chalcogen radical is —S—.

5. A polysulfide polymer as recited in claim 3 wherein said R is the radical —$C_2H_4OCH_2OC_2H_4$—, and $x$ is a number from 2 to 10.

6. A polysulfide polymer as recited in claim 3 which is a liquid.

7. A polysulfide polymer as recited in claim 3 wherein said $R^i$ and $R^{ii}$ are

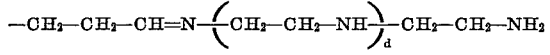

8. A polysulfide polymer as recited in claim 7 wherein said $d$ is 2.

9. A process for providing an amino-functional azomethine containing polysulfide polymer comprising the steps of
(A) admixing
(i) a liquid polysulfide polymer of the formula

wherein HL— is a chalcogen hydric radical selected from the group of chalcogen hydric radicals consisting of mercaptan and hydroxyl, R is an intervening group selected from the group consisting of alkylene radicals, ethylenically unsaturated aliphatic hydrocarbon radicals, saturated aliphatic oxahydrocarbon radicals, saturated aliphatic thiahydrocarbon radicals and araliphatic radicals, $x$ is a number greater than one, and $y$ and $z$ are each numbers that are one of 1, 2, 3, and 4, with
(ii) at least $a$ mols of an alkenal of the formula

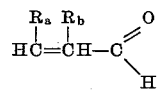

wherein $a$ is a number that is equal to or less than the number of equivalents of chalcogen hydric radicals present in said polysulfide polymer, and $R_a$ and $R_b$ are radicals selected from group consisting of hydrogen, normal and branched alkyl radicals having up to 6 carbon atoms, and substituted and unsubstituted alkylene-aromatic, aromatic, and alicyclic radicals;
(B) heating the admixture formed in Step A to at least about 40° C. for at least about 2 hours;
(C) admixing the reaction product of Step B with at least $a$ mols of a poly-primary amine of the formula

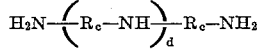

wherein $R_c$ is an alkylene group having up to 6 carbon atoms and $d$ is an integer that is one of 0, 1, 2, 3, 4, and 5; and
(D) heating the admixture formed in Step C to at least about 50° C. for at least about 1 hour.

References Cited
UNITED STATES PATENTS

| | | | |
|---|---|---|---|
| 2,606,173 | 8/1952 | Fettes | 260—79 |
| 2,789,958 | 4/1957 | Fettes et al. | 260—79.1 |
| 3,247,163 | 4/1966 | Reinking | 260—2 |

DONALD E. CZAJA, *Primary Examiner.*

LEON J. BERCOVITZ, *Examiner.*

M. I. MARQUIS, *Assistant Examiner.*